(12) United States Patent
Tu et al.

(10) Patent No.: US 6,868,194 B2
(45) Date of Patent: Mar. 15, 2005

(54) METHOD FOR THE EXTRACTION OF IMAGE FEATURES CAUSED BY STRUCTURE LIGHT USING IMAGE RECONSTRUCTION

(75) Inventors: Peter Henry Tu, Niskayuna, NY (US); Glen William Brooksby, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 635 days.

(21) Appl. No.: 09/683,371

(22) Filed: Dec. 19, 2001

(65) Prior Publication Data

US 2003/0112449 A1 Jun. 19, 2003

(51) Int. Cl.[7] .................................................. G06K 9/20
(52) U.S. Cl. .................................................... 382/312
(58) Field of Search .................... 235/559.22, 559.39; 345/419, 426; 348/161; 356/3.09, 601–604, 606–608, 614, 393, 394; 382/151, 152, 153, 154, 312, 321

(56) References Cited

U.S. PATENT DOCUMENTS

| 5,465,037 | A | * | 11/1995 | Huissoon et al. ...... 318/568.11 |
| 5,589,942 | A | | 12/1996 | Gordon ....................... 356/376 |
| 5,621,529 | A | | 4/1997 | Gordon et al. .............. 356/376 |
| 5,995,650 | A | * | 11/1999 | Migdal et al. .............. 382/154 |
| 6,205,240 | B1 | * | 3/2001 | Pietrzak et al. ............. 382/152 |
| 6,639,594 | B2 | * | 10/2003 | Zhang et al. ............... 345/426 |
| 6,700,668 | B2 | * | 3/2004 | Mundy et al. .............. 356/601 |
| 6,753,876 | B2 | * | 6/2004 | Brooksby et al. ........... 345/589 |

OTHER PUBLICATIONS

Kevin Harding & D. Svetkoff, "3D Laser Measurements On Scattering And Translucent Surfaces", SPIE Proceedings vol. 2599, Three–dimensional and Unconventional Imaging for Industrial Inspection and Metrology, editor Harding, Phil. Oct. 1995, pp. 217–227.

Kevin Harding, "Speckle Reduction Methods for Laser Line Gages", Proceedings, SPIE vol. 3204, editor K. Harding, pp. 137–144, (1997).

* cited by examiner

Primary Examiner—Jose L. Couso
(74) Attorney, Agent, or Firm—Jean K. Testa; Patrick K. Patnode

(57) ABSTRACT

A method for generating, in a non-contact range finding and measurement system, a template structure representative of the surface of an observed object, and for utilizing the template structure to synthesize data points in corrupted regions of an image of the object.

13 Claims, 5 Drawing Sheets

METHOD FOR THE EXTRACTION OF IMAGE FEATURES CAUSED BY STRUCTURE LIGHT USING IMAGE RECONSTRUCTION

BACKGROUND OF INVENTION

The present invention relates to a system for observing objects in three dimensional space using structured light. More particularly, the invention relates to a multi-camera, three dimensional sensing system providing non-contact gauge measurements of an object using known object templates and known epi-polar geometry to identify observable projections of structured light on the surface of an object; and, to reconstruct corrupted portions of images of the projected structured light.

As shown in FIG. 1, measurement systems such as laser range finders, illuminate an object undergoing measurement using structured light. Reflections of structured light projected on the surface of the object are captured by two or more calibrated cameras, generating images of illuminated portions of the object's surface. In some applications, structured light is in the form a set of laser planes. Where laser planes intersect the surface of the object, a striping effect is achieved. By detecting these laser light stripes in images of the object's surface, point correspondences can be established and triangulation techniques employed to reconstruct a representation of the surface of the object.

First, a single pixel on each stripe in an image from a first camera is selected, as seen in FIG. 2. Given that the position of a first camera lens in space is known and the selected pixel is known, then it is known that the point corresponding to the selected pixel lies on a known line drawn from the lens center out into space. This line appears as a line in an image from a second camera. This line is called the epi-polar line of the selected point in the first image. Since the position of the lens center of the second camera is also known, this epi-polar line can be calculated and drawn in the second image. The epi-polar line, when drawn in the second image, will intersect at least one, and most likely several, of the stripes of the second video image. It is known that one of the pixels where the epi-polar line and a stripe intersect represents the selected point in the first image. The actual coordinate location in space of the point corresponding to any of these intersection points is determined by simple triangulation. Since the position in space of each plane of light which created the stripes is also known, the single point of all the intersection points which correspond to the selected point in the first image is ascertained by determining the three-dimensional coordinate of each intersection point to determine if it lies on one of the known planes of light. The intersection point which lies closest to a known plane of light is taken as the selected point.

The surface of many objects includes regions which are shiny or have otherwise poor reflectivity characteristics. Structured light projected onto these surfaces results in multiple reflections or clutter causing poor laser stripe identification in generated images. Furthermore, in some situations, entire image regions which are representative of portions of an object's surface may become corrupted due to noise or interference.

Accordingly, there is a need for a method of reconstructing projected laser stripes in those portions of images which are heavily corrupted due to reflection, noise, or interference.

SUMMARY OF INVENTION

Briefly stated, the present invention sets forth a method for generating a template structure representative of the surface of an object, and for utilizing the template structure to synthesize projected laser stripe data points in corrupted image regions, thereby improving the accuracy of current laser range finding and measurement systems.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
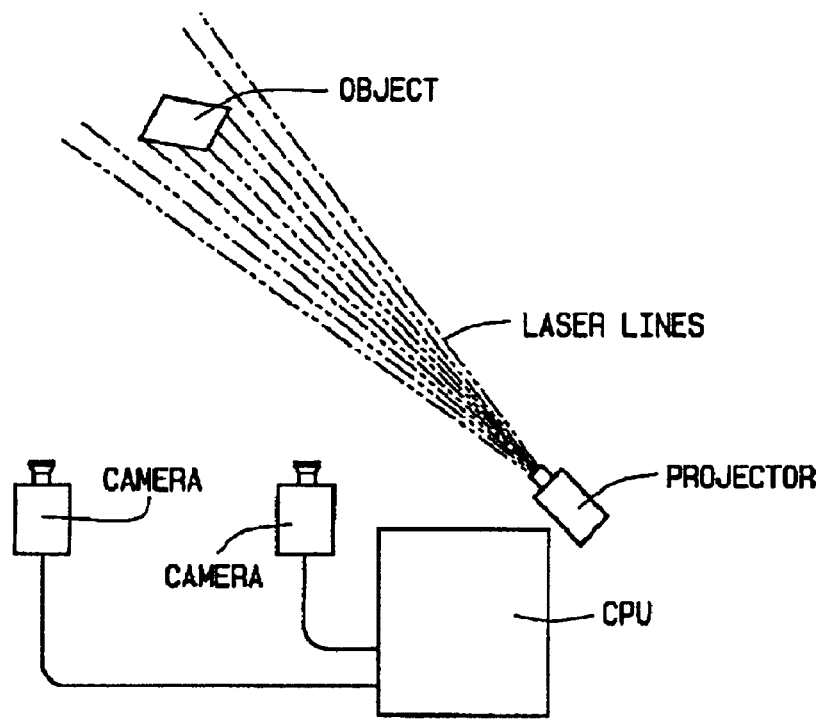
FIG. 1 is a simplified view of a prior art three dimensional sensing system with which the present invention can be used.
Figure 2:
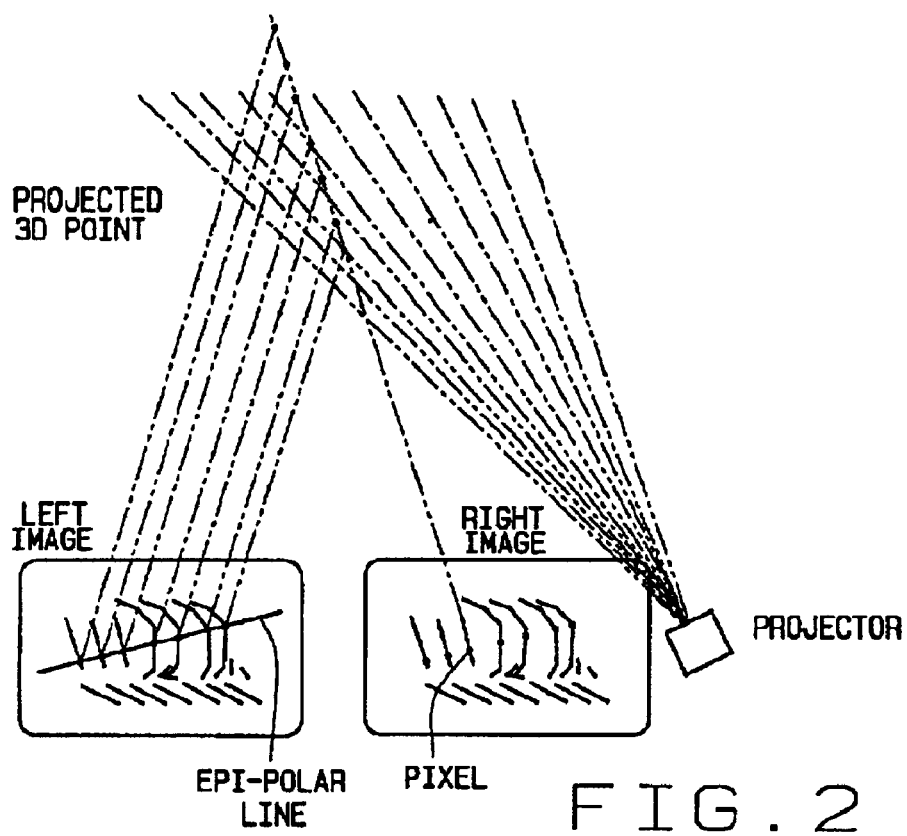
FIG. 2 is a simplified view of recorded images superimposed on a pictorial representation of light planes of the prior art three dimensional sensing system shown in FIG. 1, which produced the images.

Using a three dimensional measurement system such as the type shown in FIG. 1, a set of canonical images is generated from repeated measurements of objects of the same type, so that the laser stripes in each image are manually identifiable. This process results in a set of templates which are representative of the surface of similar objects. Subsequent scans of similar objects will produce similar laser striping patterns, with any deviations from the template structures due to variations in the scanned object surface morphology.

Figure 3:
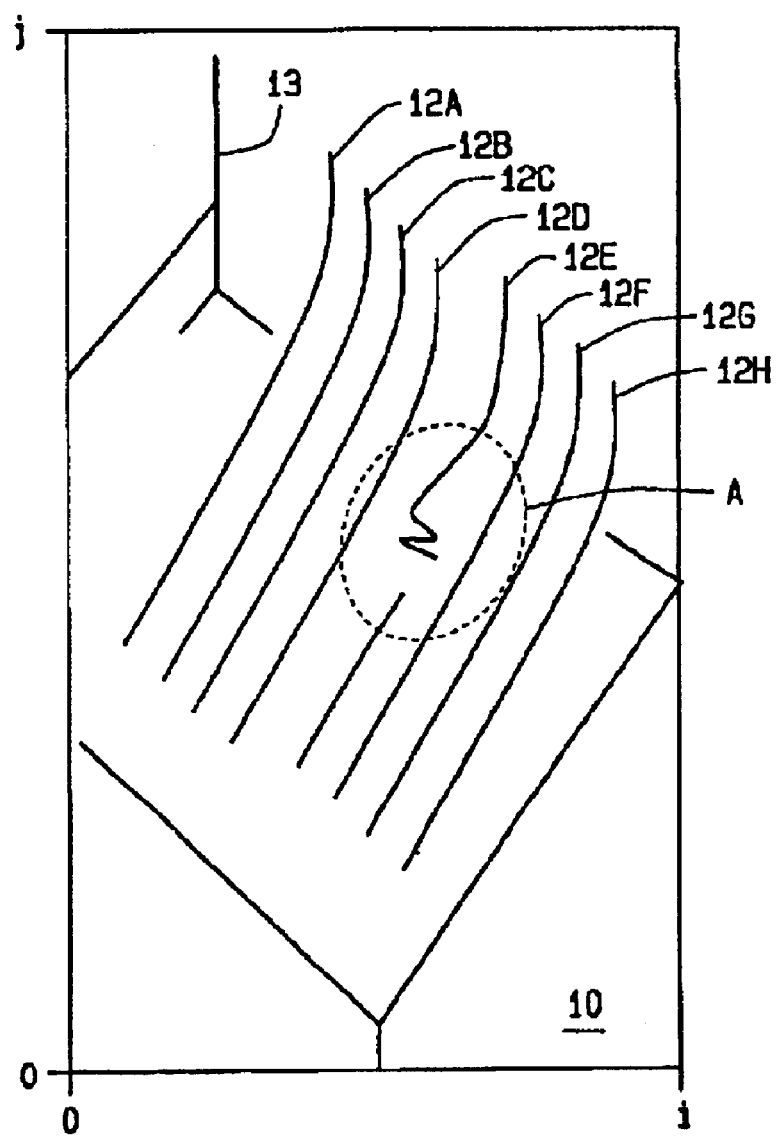
FIG. 3 is a simplified view of a image of laser stripes projected on a surface of an object, including both coherent and corrupted regions.

The template structures represent prior knowledge of the surface of the objects, such that features in subsequent images, such as seen in FIG. 3, which are inconsistent with the expected results, as represented by the templates, can be ignored or de-emphasized.

Figure 5:
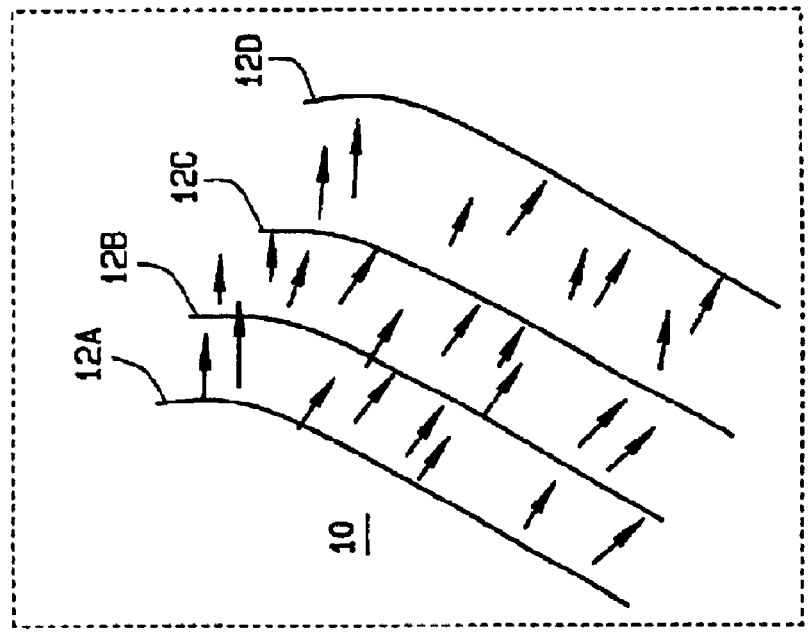
FIG. 5 is a simplified diagram of a perpendicular flow field for a portion of the image shown in FIG. 3.
Figure 4:
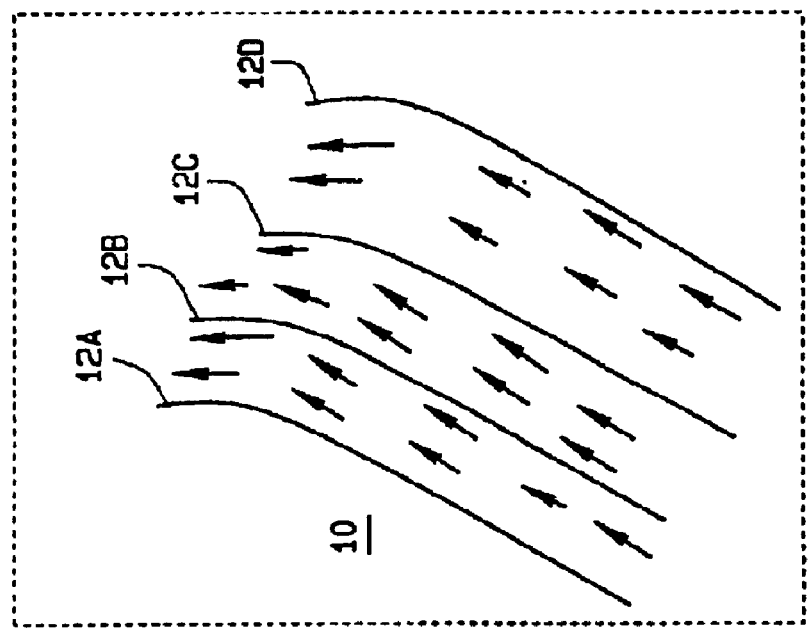
FIG. 4 is a simplified diagram of a tangential flow field for a portion of the image shown in FIG. 3.

Predetermined template structures can be used in various ways to increase the fidelity of the laser stripe localization process. By using the template structures as a guide, a two-dimensional locally matched filter may be generated for each point in an image 10 of projected laser stripes 12A–12H on the surface of an object 13, such as shown in FIG. 3. Next, a flow field is established which defines an orientation for each point in an image. The flow field, which may be either a tangential flow field, as seen in FIG. 4, or a perpendicular flow field as seen in FIG. 5, is generated using the templates by way of an orientation diffusion process, such as, but not limited to, interpolation methods and relaxation methods. Each arrow shown in FIGS. 4 and 5 represents the assigned flow for a given pixel comprising the image. The filtering is done in two passes. In the first pass, each pixel (i,j) in an image is given the value:

$$v(i,\ j) = \sum_R (\text{image}(r) \times \text{gaussian}(r))$$

where R is a curve which emanates from pixel (i,j) and is always tangential to the flow field, r is a measure of arc length along curve R, and image(r) is the image intensity value for a point on curve R. The gaussian term localizes this one dimensional filter.

In the second pass, each pixel (i,j) is given the value:

$$t(i,\ j) = \sum_P (v(p) \times \text{gaussian}(p))$$

where P is a curve emanating from pixel (i,j) and is always perpendicular to the flow field, and p is a measure of arc length along curve P. The result of this two pass approach is a two-dimensional local matched filter responsive to the original image 10. The matched filtering enhances much of the true signal while suppressing unwanted noise. Alternatively, a single pass approach could also be used by employing a two-dimensional filter. Or, separable one-dimensional filters which are not gaussian could be employed within the scope of the invention.

Once the image 10 has been processed with the filters to obtain values for v(i,j) and t(i,j) for each pixel, non-maximal suppression techniques are utilized to identify the centers of each laser stripe 12A 12H within image 10. In one embodiment, each raster line in an image is scanned to identify points where t(i,j) is a local maximum with respect to the raster line. These points represent the center of detected laser stripe structures in the raster line. In this way, the laser stripe signal to noise ratio is increased, resulting in an increase in measurement accuracy.

Figure 6:
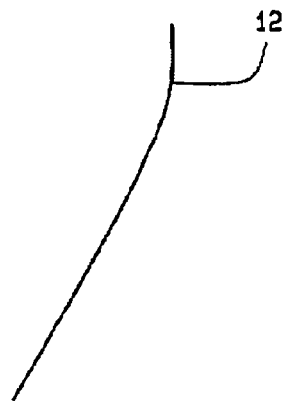
FIG. 6 is a simplified view of a single laser stripe from an uncorrupted image region.
Figure 7:
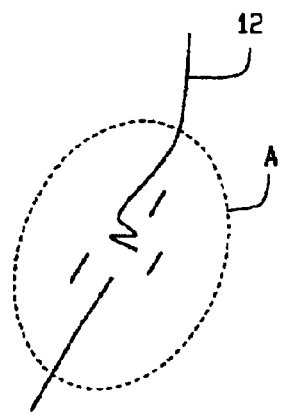
FIG. 7 is a simplified view of a single laser stripe from a corrupted image region.

As seen in FIG. 3, due to problems associated with reflections and laser specularity, a region A in an image may become corrupted. A corrupted region is defined as a region wherein the projected laser stripes are either indistinct or are unstructured, i.e. the laser stripe is broken into a series of discontinuous points. To determine if a local region of an image is corrupted by either reflections or laser specularity, each pixel (i,j) in the image (which is representative of a center point in a laser stripe projection 12, as defined by t(i,j) being a local maxima, or zero-crossing) is identified. If pixels (i,j) representative of local maxima in a region are in a structured pattern, i.e. form a line or are "chained", as seen in FIG. 6, the region is considered to be coherent and not corrupted. Alternatively, if there are no pixels (i,j) representative of local maxima in a region, or if the representative pixels (i,j) do not form a structured pattern, i.e., are incoherent, as seen in FIG. 7, the region is marked as corrupted.

As seen in FIGS. 3 and 6, using the generated template structure and known epi-polar line geometry, the portions of a laser stripe in non-corrupted regions of image 10 can be readily identified. Points on the laser stripe passing through a corrupted region "A" in image 10 cannot be accurately identified from a single image.

Figure 8:
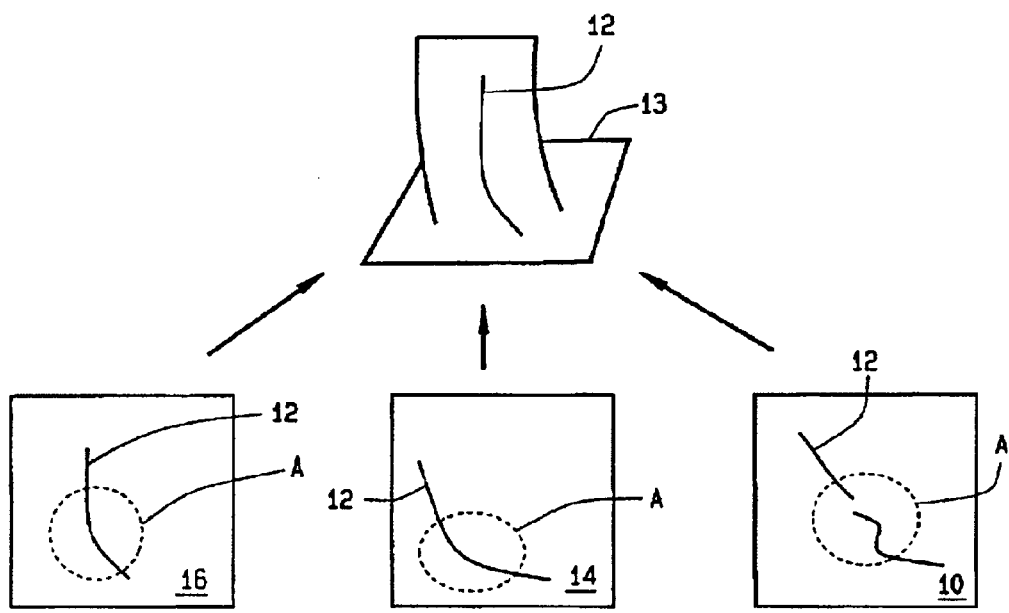
FIG. 8 is a collection of three images of a single laser stripe projected on a surface of an object, as seen from three individual cameras.

In one embodiment, shown in FIG. 8, two or more uncorrupted images 14, 16 of the corrupted laser stripe region A, obtained by two or more different cameras located at different positions and orientations, are utilized to synthesize data points representative of the laser stripe using triangulation and projection. As seen in FIG. 8, a point in the corrupted region A of a first image 10 can be synthesized if it is visible in uncorrupted regions of two or more separate images 14, 16. First, a target point in the corrupted region A of the first image is identified using the template structure for the object. Next, using epi-polar geometry and the known template structure, a corresponding point is identified on a laser stripe 12 in an uncorrupted image 14. The corresponding point in the first uncorrupted image 14 is used, together with epi-polar geometry, to find the associated laser line in the second uncorrupted image 16.

The position and orientation of the cameras generating the first and second uncorrupted images 14, 16 is known, hence each point on the laser stripe 12 observed by the two cameras is known to lie on two separate lines. The three-dimensional location of each of the points is known to be the intersection of the two lines and can be determined by triangulation. Using the known position of a point in an uncorrupted image which corresponds to a data point of a corrupted image, together with the known camera position for the camera which generated the corrupted image, the position of a data point representing the target point on the laser stripe in the corrupted image can be accurately synthesized through the process of projection.

Figure 9:
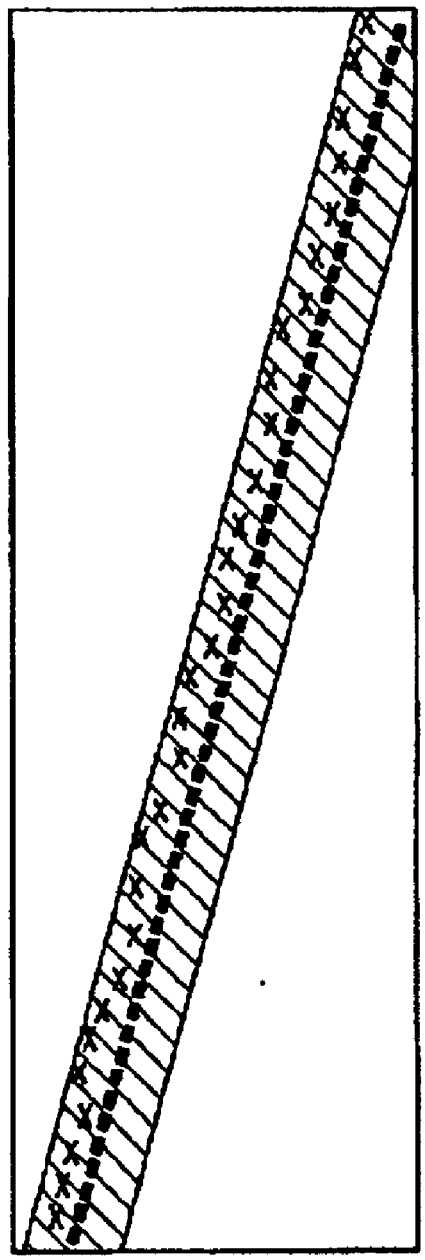
FIG. 9 is a before and after representation of image pixels defining local maxima in a corrupted region, illustrating improved coherent structure following reconstruction.

FIG. 9 illustrates the location of pixels identified as local maxima in a corrupted region of an image (shown as X's) together with the locations of synthesized points (shown as a dashed line). As can be seen the pixels identified as local maxima are unstructured, or incoherent, forming a wavy line, while the points representative of the laser stripe synthesized from uncorrupted images form a structured or coherent straight-line structure, representative of the laser stripe location in the image.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for synthesizing image points representative of laser stripes projected onto the surface of an object in a non-contact gauge measurement system, comprising:

obtaining a first image of said projected laser stripes from a first camera;

identifying at least one corrupted region in said first image;

obtaining a plurality of additional images of said projected laser stripes from a corresponding plurality of cameras, wherein said corresponding plurality of cameras are each displaced from said first camera;

identifying at least one point in each of said plurality of additional images corresponding to a target point in said corrupted region of said first image;

determining the three-dimensional position of said at least one point using said plurality of additional images; and utilizing said determined three-dimensional position of said at least one point to synthesize a data point in said corrupted region representing said target point.

2. The method of claim 1 for synthesizing image points wherein the step of identifying at least one corrupted region in said first image includes identifying points in said first image representative of local maxima.

3. The method of claim 2 for synthesizing image points wherein a region is identified as corrupted if no points in said region are representative of local maxima.

4. The method of claim 2 for synthesizing image points wherein a region is identified as corrupted if points identified as representative of local maxima form an unstructured pattern.

5. The method of claim 1 for synthesizing image points wherein the step of determining the three-dimensional position of said at least one point includes triangulating a laser stripe in said plurality of additional images.

6. The method of claim 1 further including the step of utilizing a template structure to establish said target point in said corrupted region of said first image.

7. The method of claim 1 wherein said determined three-dimensional position of said at least one point is utilized to project a data point corresponding to said target point in said corrupted image region.

8. A method for synthesizing image points representative of laser stripes projected onto the surface of an object in a non-contact gauge measurement system, comprising:

obtaining a first image of said projected laser stripes from a first camera;

identifying at least one corrupted region in said first image;

utilizing a predetermined template structure to select a target point on a portion of a chosen laser stripe passing through said corrupted region;

obtaining an additional plurality of images of said projected laser stripes from a corresponding plurality of cameras, wherein said corresponding plurality of cameras each have a known geometry and are each displaced from said first camera;

utilizing said predetermined template structure and epi-polar geometry to identify a data point on said image of said chosen laser stripe in a first of said additional plurality of images, said data point corresponding to said selected target point;

utilizing said data point and epi-polar geometry to identify a laser stripe in a second of said additional plurality of images corresponding to said chosen laser stripe; and utilizing said known geometry of said cameras, together with said data point and said identified laser stripe to synthesize a representative point in said corrupted region through projection.

9. The method of claim 8 for synthesizing image points wherein the step of identifying at least one corrupted region in said first image includes identifying points in said first image representative of local maxima.

10. The method of claim 9 for synthesizing image points wherein a region is identified as corrupted if no points in said region are representative of local maxima.

11. The method of claim 9 for synthesizing image points wherein a region is identified as corrupted if points identified as representative of local maxima form an unstructured pattern.

12. The method of claim 8 for synthesizing image points wherein the step of determining the three-dimensional position of said at least one point includes triangulating a laser stripe in said plurality of additional images.

13. The method of claim 12 wherein said determined three-dimensional position of said at least one point is utilized to project a data point corresponding to said target point in said corrupted image region.

* * * * *